United States Patent
Liu et al.

(10) Patent No.: US 11,358,081 B2
(45) Date of Patent: Jun. 14, 2022

(54) SPINEL-REINFORCED MAGNESIUM OXIDE-BASED FOAM CERAMIC FILTER AND PREPARATION METHOD THEREFOR

(71) Applicants: JIANGSU ZHONGYI AUTOMOBILE NEW MATERIAL TECHNOLOGY CO., LTD., Jiangsu (CN); NANJING UNIVERSITY OF AERONAUTICS AND ASTRONAUTICS, Jiangsu (CN)

(72) Inventors: Xiqin Liu, Jiangsu (CN); Zili Liu, Jiangsu (CN); Siyu Liu, Jiangsu (CN); Jian Li, Jiangsu (CN)

(73) Assignees: JIANGSU ZHONGYI AUTOMOBILE NEW MATERIAL TECHNOLOGY CO., LTD., Jiangsu (CN); NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 117 days.

(21) Appl. No.: 16/753,546

(22) PCT Filed: Jun. 1, 2018

(86) PCT No.: PCT/CN2018/089569
§ 371 (c)(1),
(2) Date: Apr. 3, 2020

(87) PCT Pub. No.: WO2019/196180
PCT Pub. Date: Oct. 17, 2019

(65) Prior Publication Data
US 2020/0306675 A1 Oct. 1, 2020

(30) Foreign Application Priority Data
Apr. 8, 2018 (CN) .......................... 201810307618.0

(51) Int. Cl.
C04B 35/626 (2006.01)
B01D 39/20 (2006.01)
(Continued)

(52) U.S. Cl.
CPC ........ B01D 39/2093 (2013.01); C04B 35/053 (2013.01); C04B 35/6264 (2013.01);
(Continued)

(58) Field of Classification Search
CPC .............. B01D 39/2093; C04B 35/053; C04B 35/6264; C04B 35/62615; C04B 35/6263;
(Continued)

(56) References Cited

U.S. PATENT DOCUMENTS 3,573,079 A * 3/1971 Shibasaki et al. ...... C04B 35/03
501/108
3,962,081 A 6/1976 Yarwood et al.
(Continued)

FOREIGN PATENT DOCUMENTS

CN 87102516 A 11/1988
CN 1410393 A 4/2003
(Continued)

OTHER PUBLICATIONS

Wang, M., et al., Effect of Al2O3 on Microstructure and Performance of MgO Ceramic, China Ceramics, 2017, vol. 53, No. 3, pp. 45-50, China Academic Journal Electronic Publishing House, www.cnki.net.

*Primary Examiner* — Noah S Wiese
(74) *Attorney, Agent, or Firm* — Hudak, Shunk & Farine Co. LPA

(57) ABSTRACT

A spinel-reinforced magnesium oxide-based foam ceramic filter that is obtained by coating onto a polyurethane foam carrier a slurry of light calcined magnesium oxide-based ceramic comprising a nanometer lanthanum oxide sintering
(Continued)

aid, and then drying and sintering. A method for preparing the foam ceramic filter comprising: 1) preparing a ceramic slurry having a solid content of 60%-70% by dosing 15%-25% by mass of a nanometer alumina sol, 0.8%-1.5% by mass of a rheological agent, and the balance magnesium oxide ceramic powder comprising a nanometer lanthanum oxide sintering aid, and then adding absolute ethanol and ball milling to mix until uniform; 2) soaking a polyurethane foam template into the ceramic slurry, squeezing by a roller press the polyurethane foam template to remove redundant slurry therein to make a biscuit, and then removing the ethanol solvent in a ventilation chamber at a temperature of 40° C.-50° C. to dry the biscuit; 3) putting the dried biscuit into a sintering furnace, elevating the temperature to 1350° C.-1550° C. and performing a high temperature sintering, cooling to the room temperature with the furnace to obtain the magnesium oxide-based ceramic foam filter.

8 Claims, 1 Drawing Sheet

(51) Int. Cl.
  *C04B 35/053* (2006.01)
  *C04B 38/06* (2006.01)
(52) U.S. Cl.
  CPC .... *C04B 38/0615* (2013.01); *C04B 35/62615* (2013.01); *C04B 2235/3217* (2013.01); *C04B 2235/3227* (2013.01); *C04B 2235/5454* (2013.01); *C04B 2235/6562* (2013.01); *C04B 2235/6567* (2013.01); *C04B 2237/61* (2013.01)

(58) Field of Classification Search
  CPC ............ C04B 35/6261; C04B 38/0615; C04B 2235/3217; C04B 2235/3227; C04B 2235/5454; C04B 2235/3222; C04B 2237/61; C04B 2111/00793
  See application file for complete search history.

(56) References Cited

U.S. PATENT DOCUMENTS

| | | | |
|---|---|---|---|
| 4,024,212 A | 5/1977 | Dore et al. | |
| 2003/0146151 A1 | 8/2003 | Chi et al. | |
| 2006/0173228 A1* | 8/2006 | Chang | C07C 1/20 585/638 |
| 2014/0338296 A1* | 11/2014 | Backhaus-Ricoult | B32B 3/26 55/523 |
| 2014/0339744 A1* | 11/2014 | Backhaus-Ricoult | C04B 35/626 264/628 |
| 2014/0342898 A1* | 11/2014 | Backhaus-Ricoult | C04B 35/10 501/80 |

FOREIGN PATENT DOCUMENTS

| | | | |
|---|---|---|---|
| CN | 1473947 A | | 2/2004 |
| CN | 101138691 A | | 3/2008 |
| CN | 101259347 A | | 9/2008 |
| CN | 100536986 C | | 9/2009 |
| CN | 102000458 A | | 4/2011 |
| CN | 101785944 B | | 12/2011 |
| CN | 103553686 A | * | 2/2014 |
| CN | 103553686 A | | 2/2014 |
| CN | 103787691 A | | 5/2014 |

\* cited by examiner

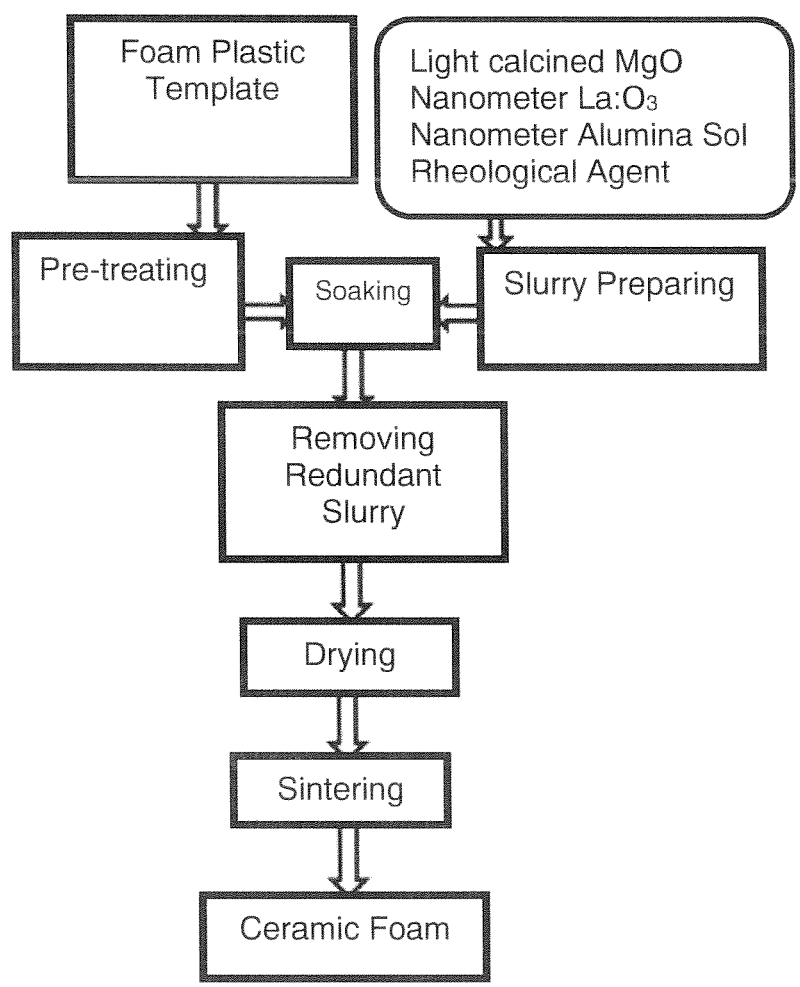

SPINEL-REINFORCED MAGNESIUM OXIDE-BASED FOAM CERAMIC FILTER AND PREPARATION METHOD THEREFOR

TECHNICAL FIELD

The present invention relates to a magnesium oxide-based ceramic foam filter and preparation method therefor, in particular, a spinel-reinforced magnesium oxide-based ceramic foam filter and preparation method therefor, and it relates to the field of metal materials and metallurgy. The filter prepared in accordance with the present invention is especially suitable for filtration and purification of a melt of magnesium or an alloy thereof, but can also be used for filtration and purification of a melt of aluminum or an alloy thereof.

BACKGROUND ART

Magnesium is chemically active and can react easily with oxygen, nitrogen and water vapor in the process of casting or handling, and the formed products may be left in magnesium, which would affect the internal quality of the article and degrade the properties of the same. According to the variety and nature of inclusions in a magnesium alloy, the inclusions are generally divided into two categories: metal inclusions and non-metal inclusions. 1) Metal inclusions: In the process of original magnesium production and subsequent handling of a magnesium alloy, some pure metals or metallic compound inclusions would be inevitably introduced, and they would present in the matrix or at the grain boundary of the magnesium alloy in the form of particles or clusters, including primarily pure metal α-Fe particles, Mn—Fe metallic compounds, such as, for example, (Fe, Mn)$_3$Si, (Fe, Mn)$_5$Si$_3$, among others; 2) non-metal inclusions: Non-metal inclusions in an magnesium alloy are primarily nitrides and oxides of magnesium, such as, for example, MgO, Mg$_3$N$_2$, among others; refining agents added in the process of smelting of magnesium alloy, primarily chlorides, such as KCl, NaCl, MgCl$_2$, among others; since the fluxing agents in the refining process cannot be removed completely, some small amount of residual fluxing agents may be present in the magnesium melt, resulting in fluxing agent inclusions in the magnesium metal. The floating oxide inclusions will be pushed to the grain boundaries by the crystallizing front, and the inclusions will be generally present at the grain boundaries of the magnesium alloy in the form of films, particles, or clusters. Statistics show that MgO accounts for more than eighty percent of all inclusions in a magnesium alloy, and is distributed in the form of films, particles, and clusters. The inclusions generated in the process of melting and casting of a magnesium alloy will not only seriously degrade the mechanical properties and anti-corrosion performance of the alloy, but also degrade the machining quality and surface quality of anodic oxidation treatment thereof. With respect to a die-casting magnesium alloy, the content of oxides in the form of films and particles inside the alloy needs to be controlled respectively below 100 cm$^2$/Kg and 100 mm$^3$/Kg to satisfy the normal operating requirements. Therefore, the purification process has been critical in the melting and casting process for removing inclusions in a magnesium melt in order to increase the purity thereof.

Melt purification process can be classified into two categories: flux purification and non-flux purification. Due to high inclusion removing efficiency, low cost, convenient operation, flux purification process has become a commonly used purification process in the manufacture of magnesium alloys. However, flux purification also exhibits disadvantages, such as, for example, increase of metal loss, flux inclusions, inability of degassing, among others. In particular, when a rear earth magnesium alloy is smelted and refined, the flux will also consume a large amount of rare earth elements in the alloy. Non-flux purification process can not only compensate for the deficiencies of flux purification process, but also exhibit excellent purification results, and thus is an important melt purification process being used and developed. Various non-flux purification technologies, such as filtration purification, spinning spraying purification, electromagnetic purification and ultrasonic wave treatment, among others, have been developed. Compared to simple metal net melt filtration, ceramic foam filters comprising particular 3-D porous ceramic structures have very good filtration effects with respect to inclusion particles in an alloy melt through filter cake effect, adsorption effect and rectification effect due to their high porosity (70%-90%), strong adsorbability, chemical corrosion resistance, among others. Ceramic foam filtration method can not only filter out fine inclusion particles as small as 10 μm-20 μm in an alloy melt, but also can filter out liquid flux inclusions that cannot be filtered out by a general filtering medium.

U.S. patent documents U.S. Pat. No. 3,962,081 A (Ceramic foam filter), U.S. Pat. No. 4,024,212 A (Ceramic foam and method of preparation) and Chinese patent document CN 103,787,691 A (A method for preparing an aluminum oxide ceramic foam) disclose methods of using Al$_2$O$_3$, ZrO$_2$, SiC or SiO$_2$-based ceramic foams for filtering inclusions in aluminum alloy or steel or iron melts; however, the standard free enthalpy of formation of MgO is very low, and the highly active Magnesium melt is very prone to react with the matrix material of the ceramic foam in accordance with the equations (1)-(4) and dissolved quickly, and accordingly blocks the filtration holes, or melts and corrodes and enters the melt of magnesium or an alloy thereof, as hazardous components. Thus, the ceramic foams of current materials are not suitable for filtration of magnesium and the alloys thereof.

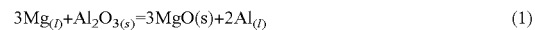

$$3Mg_{(l)}+Al_2O_{3(s)}=3MgO(s)+2Al_{(l)} \qquad (1)$$

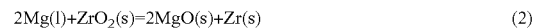

$$2Mg(l)+ZrO_2(s)=2MgO(s)+Zr(s) \qquad (2)$$

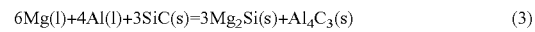

$$6Mg(l)+4Al(l)+3SiC(s)=3Mg_2Si(s)+Al_4C_3(s) \qquad (3)$$

$$4Mg(l)+SiO_2(s)=2MgO(s)+Mg_2Si(s) \qquad (4)$$

MgO is with a NaCl structure, cubic system, lattice constant being 0.411 nm, and is an ionic bond compound, melting point being 2852° C., which is much higher than commonly used Al$_2$O$_3$ (205° C.) and SiO$_2$ (1650±50° C.). Therefore, articles formed of magnesium oxide exhibit characteristics such as good chemical stability, high resistivity and anti-erosion abilities to metals, slag and alkaline solutions. Compared to commonly used ceramic materials, MgO exhibits good high temperature chemical stability against magnesium and the alloys thereof, does not react with the flux inclusions comprised of molten chlorides and fluorides, and has a relatively small wetting angle with respect to the flux inclusions and thus readily adsorb the same in magnesium melt. Accordingly, MgO ceramic foams are ideal materials for smelting, refining and purification of magnesium alloys.

It would be a necessary and most critical step of preparing ceramic materials to perform sintering below the melting point of the oxide components, and the sintering and grain growing process at a high temperature will decide the micro-structure and performance of a ceramic material. Chinese patent documents CN 1,011,306 B (Pure Magnesium Oxide Ceramic Foam Filter and Process of Preparing the Same), CN 101,138,691 A (Method of Preparing Magnesium Ceramic Foam Filter for Casting) disclose using pure magnesium oxide as the starting material to produce ceramic filters. Since MgO has a very high melting point and thermal expansion coefficient ($13.5 \times 10^{-6}/°$ C.), the sintering of the same is difficult (the sintering temperature should not be lower than 0.8 of its melting point) and the thermal shock resistance is poor, which limit the use and development of MgO ceramic foams.

Researches show: when the sintering temperature in a ceramic sintering process is decreased by 100° C., the heat consumption for unit product will be reduced by 10%. An important technical means of decreasing the sintering temperature of MgO ceramic foam is addition of a sintering aid. When $V_2O_5$ powder is added, MgO and $V_2O_5$ will form a liquid phase having a formula similar to $Mg_3V_2O_5$ at 1190° C. to facilitate the sintering and decrease the sintering temperature of a MgO ceramic foam significantly. However, in use, $V_2O_5$ will cause damages to respiratory system and skin, and accordingly strict restrictions are imposed on the operations thereof. Same to $V_2O_5$, cobalt oxide is also a good low temperature sintering aid, but the use is restricted due to its highly toxic nature and rare resources. Fluorides are commonly used strong solubilizer and mineralizer in ceramic industrial sintering. Chinese patent documents CN 100,536,986 C (Magnesium Oxide Ceramic Foam Filter), CN 1,473,947 A (Ceramic Foam for Purification of Magnesium and Magnesium Alloys) and CN 101,785,944 B (Method of Preparing Magnesium Ceramic Foam for Filtration of Magnesium and Magnesium Melt) disclose adding fluorite (melting point: 1423° C.) and magnesium fluoride (melting point: 1248° C.), wherein the solid solution of the fluoride during sintering would increase the lattice distortion of the magnesium oxide matrix, and the fluoride would be prone to form a liquid having a lower melting point, so as to decrease the sintering temperature of the magnesium oxide ceramic. However, in the sintering process, fluorine in the fluorides would be bonded with Si, Al, Fe and Ca, and most of them (account for about 70% in production of tiles) is volatilized in gas form, which would not only erode the ceramic body and degrade the quality of the sintered ceramic, but also, more seriously, it would be discharged to the atmosphere and cause fluoride contamination. Fluorides can enter human body via respiratory tract, digestive tract and skin, and have toxic effect on central nervous system and myocardium. Low concentration fluoride contamination would result in crispy calcification of teeth and bones. Pollutant Discharge Standard of Ceramic Industry (GB25464-2010) provides that the fluoride discharge standard must be less than 5.0 $mg/m^3$, while using a fluoride as low temperature sintering aid for a magnesium oxide ceramic would inevitably increase discharge of gaseous fluorides and increase the burden of environmental protection investment. Furthermore, the fluoride particles in the residual solubilized fluorides in the ceramic are present in the form of substituted oxygen ions, which would result in decrease of chemical stability of intergranular bonds and difficulty of resisting long period of erosion by the flux inclusions in the magnesium melt. In the slurry for preparing the ceramic foam filter disclosed in Chinese patent document CN 101,138,691 A, sodium silicate, a silica sol and ethyl silicate are used as adhesives, and the component $SiO_2$ present between the sintered foam ceramic particles are prone to react with the melt of magnesium and the alloys thereof in accordance with equation (4), which also decreases the chemical stability of the ceramic foam. In the Chinese patent documents CN 100, 536,986 C (Magnesium Oxide Ceramic Foam Filter) and CN 103,553,686 A (A Magnesium-Alumina Spinel Ceramic Foam Filter and Method of Preparing the Same), diboron trioxide and sodium borate are used as the low temperature sintering aids for the magnesium oxide ceramic. Diboron trioxide will form a liquid at a temperature higher than 450° C., and when sintering temperature is higher than 1350° C., it will react with magnesium oxide to form magnesium borate present in a liquid form, so as to decrease the sintering temperature. However, diboron trioxide is prone to react with magnesium and aluminum, and thus is not stable in the magnesium alloy or aluminum alloy melt. Moreover, since diboron trioxide can be dissolved in a solvent, such as water and ethanol, it can absorb water in the air mightily to form boric acid. The diboron trioxide added in the process of preparation of a ceramic foam will be dissolved in water to form a water solution of boric acid, which is prone to react with magnesium oxide to form a magnesium borate precipitate, so as to reduce its effect. Gallium oxide is a family oxide of diboron trioxide, and forms a spinel-type $MgGa_2O_4$ with magnesium oxide at a low temperature, so as to decrease the sintering temperature. However, gallium has rare resources (gallium is a strategic reserved metal), and the higher cost has limited its use in general ceramics.

SUMMARY OF THE INVENTION

The present invention provides a spine-reinforced magnesium oxide-based ceramic foam filter that can be sintered at low temperature, has excellent chemical stability and thermal shock resistance, and a method for preparing the same.

In order to achieve the above-identified technical objective, the technical solution of the present invention are as follows:

A spinel-reinforced magnesium oxide-based ceramic foam filter that is obtained by coating onto a polyurethane foam carrier a slurry of light calcined magnesium oxide-based ceramic comprising a nanometer lanthanum oxide sintering aid, and then drying and sintering.

A method for preparing a spine-reinforced magnesium oxide-based ceramic foam filter comprising the steps of:

(1) Preparing a ceramic slurry having a solid content of 60%-70% by dosing 15%-25% by mass of a nanometer alumina sol, 0.8%-1.5% by mass of a rheological agent, and the balance magnesium oxide ceramic powder comprising a nanometer lanthanum oxide sintering aid, and then adding absolute ethanol and ball milling to mix until uniform. The added nanometer alumina sol not only forms $\gamma$-$Al_2O_3$ coating film on the surfaces of the light calcined magnesium oxide particles and the highly uniformly dispersed nanometer $La_2O_3$ powder and functions as an adhesive, in the sintering process, $Al_2O_3$ and $La_2O_3$ will perform an in-situ reaction with MgO and form respectively a $MgAl_2O_4$ spinel phase and a $MgLa_2O_4$ spinel phase that exhibit chemical stability against the melt of magnesium and alloys thereof (the electronegativity of La is smaller than Mg and Al, and accordingly the chemical stability of $MgLa_2O_4$ spinel phase is higher than $MgAl_2O_4$). Therefore, the in-situ formed spinel phase in the foam filter prepared by the present invention will directly weld the cristobalite MgO grains together, and such a structure exhibits good chemical stability in a magnesium melt, and thus avoids the damage to the chemical stability of ceramic foam due to addition of adhesives such as silica sol, ethyl silicate, among others, to the prior art products.

The rheological agent is a mixture of polyvinyl butyral and a cellulose ether, wherein polyvinyl butyral accounts for 50% of the weight of the rheological agent, the cellulose ether is one of industrially used hydroxy propyl methyl cellulose and hydroxyethyl cellulose, or a mixture thereof. The Cellulose ether and polyvinyl butyral are not only a good dispersant for the nanometer lanthanum oxide which can prevent the slurry from agglomeration, but also functions as an adhesive in preparing a biscuit. Upon soaking, the slurry can be securely adhered to a polyurethane foam board such that the biscuit will have a very big strength, and the cellulose ether and polyvinyl butyral can escape very easily in the sintering process without contaminating the articles. Sodium carboxymethyl cellulose is not used in the rheological agent, which removes the obstacle for the ceramic sintering formed by the residual $Na^+$ having a greater ion radius.

Preferably, the nanometer alumina sol has a solid content of 20%-25%, and a pH value of greater than, or equal to 4.

The magnesium oxide ceramic powder comprising a nanometer lanthanum oxide sintering aid is a mixture of a light calcined magnesium oxide and a nanometer lanthanum oxide. The light calcined magnesium oxide powder has a particle size in the order of 250-500 meshes, the nanometer lanthanum oxide accounts for 1%-3% of the weight of the ceramic powder, the nanometer lanthanum oxide has a particle size of 30-60 nm (mean diameter $d_{50}$ is 58 μm). The added nanometer lanthanum oxide will react with the highly active light calcined magnesium oxide to form a $MgLa_2O_4$ spinel phase (melting point: 2030° C.) having an excellent high temperature stability. Although the starting material alumina sol component comprises $γ-Al_2O_3$ that will react with the magnesium melt, in the sintering process, $γ-Al_2O_3$ in the alumina sol will perform an in-situ reaction with MgO to form a high melting point phase $MgAl_2O_4$ (melting point: 2135° C.) having a face centered cubic lattice structure, which will directly melt the cristobalite MgO grains together. The light calcined magnesium oxide fine powder used herein has a relatively big lattice constant, with more structural defects, and has an extremely high sintering activity. In the sintering process, the nanometer alumina sol and the nanometer lanthanum oxide can be solid-solubilized into the lattice of MgO to cause a lattice distortion to the MgO crystal, and thus result in lattice activation; and by the reaction with the MgO particles, spinel phases of new compounds $MgAl_2O_4$ and $MgLa_2O_4$ are formed, so as to facilitate the sintering and bonding between the particles. The highly sintering active light calcined magnesium oxide particles are wrapped by nanometer alumina sol film, and in the sintering process, to perform an in-situ reaction and form a spinel ($MgAl_2O_4$) phase to directly melt the cristobalite MgO grains together.

A method of preparing a ceramic slurry using the above ceramic powder is: adding the light calcined magnesium oxide powder into a ball milling tank in accordance with the ratio; mixing the nanometer alumina sol, nanometer lanthanum oxide, rheological agent and absolute ethanol and ultrasonic treating the mixture for 30-60 minutes to cause the nanometer lanthanum oxide powder to be fully dispersed; adding the mixture into the ball milling tank; adding corundum balls in a ball to material ratio of 2:1; and ball milling for 2-4 hours with a rotation speed of 60-120 rpm until a uniform mixture is achieved.

(2) Soaking a polyurethane foam template into the ceramic slurry, roller squeezing the polyurethane foam template to remove redundant slurry therein to make a biscuit, and then removing the ethanol solvent in a ventilation chamber at a temperature of 40° C.-50° C. to dry the biscuit.

The specification of the polyurethane foam template is 10 PPI-20 PPI; the polyurethane foam template is first soaked in a water solution of 15%-20% NaOH at 40° C.-50° C. for surface etching for 40-60 minutes, washed by clean water and naturally dried, and then soaked into a water solution of 2%-4% wetting agent dodecylbenzene sulfonic acid, and taken out and dried before use. By NaOH etching, the surface of the polyurethane foam template is roughened, and after treated by the water solution of the wetting agent dodecylbenzene sulfonic acid, it will be easy for the ceramic slurry to be coated onto the polyurethane foam template.

(3) Putting the dried biscuit into a sintering furnace, elevating the temperature to 1350° C.-1550° C. for high temperature sintering, cooling to the room temperature with the furnace to obtain a magnesium oxide-based ceramic foam filter.

In the sintering process, the temperature is first elevated to 550° C. at a temperature rising rate of 30° C./h to have organic substances (for example, the polyurethane foam and the rheological agent, among others) in the ceramic foam filter biscuit to be decomposed, gasified and discharged, then the temperature is elevated to 1100° C. at a temperature rising rate of 200° C./h. In the low temperature sintering stage, a lower temperature rising rate would be able to prevent the polyurethane foam and the rheological agent from being decomposed too quickly, which would cause the biscuit to collapse or damaged due to deformation. Finally, the temperature is elevated to 1350° C.-1550° C. at a temperature rising rate of 50° C./h and the temperature is maintained for 2-3 hours. In the high temperature sintering stage, after the sintering temperature is above 1100° C., the lower temperature rising rate would be able to ensure a consistent temperature in the sintered body, and avoid a constant formation rate of spinel and sintered body deformation and cracking due to extremely quick generation of phase transformation stresses.

The method for preparing the magnesium oxide-based ceramic foam filter provided by the present invention is simple, cost low, efficiency high and suitable for industrial scale production. The magnesium oxide-based ceramic foam filter so prepared is free of any components that decrease its chemical stability, and the nanometer alumina sol and nanometer lanthanum oxide can not only function to decrease the sintering temperature, but can also be dispersed highly uniformly in the magnesium ceramic powder particles and react with the same to form $MgAl_2O_4$ and $MgLa_2O_4$ spinel phases that are chemically stable against the melt of magnesium and alloys thereof, which weld the magnesium oxide particles together. Therefore, the ceramic foam filter exhibits good strength, chemical stability and thermal shock resistance, and is especially useful for filtration and purification of the inclusions in the melt of magnesium and alloys thereof. It can also be used for filtration and purification of the melt of aluminum and alloys thereof. As compared to the prior art, the present invention achieves the following technical effects:

1. The spinel-reinforced magnesium oxide-based foam ceramic filter of the present invention exhibits excellent chemical stability. The added nanometer lanthanum oxide will react with the highly active light calcined magnesium oxide to form a $MgLa_2O_4$ spinel phase (melting point: 2030° C.) having an excellent high temperature stability. Although the starting material alumina sol component comprises γ-$Al_2O_3$ that will react with the magnesium melt, in the sintering process, γ-$Al_2O_3$ in the alumina sol will perform an in-situ reaction with MgO to form a high melting point phase $MgAl_2O_4$ (melting point: 2135° C.) having a face centered cubic lattice structure, which will directly melt the cristobalite MgO grains together.

In the reaction system of MgO—$Al_2O_4$ sintered ceramic with magnesium melt and addition of Aluminum oxide, the following reactions may be present in addition to reaction equation (1):

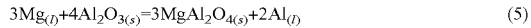

$$3Mg_{(l)}+4Al_2O_{3(s)}=3MgAl_2O_{4(s)}+2Al_{(l)} \quad (5)$$

The reaction of aluminum oxide with magnesium oxide to form Mg—Al spinel $MgAl_2O_4$ is:

$$MgO_{(s)}+Al_2O_{3(s)}=MgAl_2O_{4(s)} \quad (6)$$

The reaction of magnesium melt with the Mg—Al spinel $MgAl_2O_4$ is:

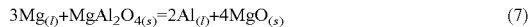

$$3Mg_{(l)}+MgAl_2O_{4(s)}=2Al_{(l)}+4MgO_{(s)} \quad (7)$$

According to *Pure substance Thermochemical Data Handbook* (Edited by Barin Ihsan, Translated by Nailiang Cheng, Beijing: The Science Press, 2003), at 900-1200 K, the Gibbs free energies of the substances in the reaction system of magnesium melt with Mg—Al spinel $MgAl_2O_4$ and the calculated results of the Gibbs free energy changes $\Delta G_1$, $\Delta G_5$, $\Delta G_6$, $\Delta G_7$ of the reactions (1), (5), (6) and (7) are shown in Table 1.

side by endotaxy growth, resulting in formation of limited solid solution between MA phase and MgO, and the MgO content in the exterior MA layer contacting the MgO particles is much higher than the average thereof. Since MgO does not react with Mg melt, the Mg—Al spinel phase in the sintered ceramic structure which melts the MgO particles together will be able to present stably in the magnesium melt.

The spinel-reinforced magnesium oxide-based foam ceramic filter of the present invention does not comprise any components that decrease its chemical stability. The added nanometer alumina sol not only forms γ-$Al_2O_3$ coating film on the surfaces of the light calcined magnesium oxide particles and the highly uniformly dispersed nanometer $La_2O_3$ powder and functions as an adhesive, in the sintering process, $Al_2O_3$ and $La_2O_3$ will perform an in-situ reaction with MgO and form respectively a $MgAl_2O_4$ spinel phase and a $MgLa_2O_4$ spinel phase that exhibit chemical stability against the melt of magnesium and alloys thereof (the electronegativity of La is smaller than Mg and Al, resulting in the chemical stability of $MgLa_2O_4$ spinel phase is higher than $MgAl_2O_4$). Therefore, the in-situ formed spinel phase in the foam filter prepared by the present invention would directly weld the cristobalite MgO grains together, and such a structure exhibits good chemical stability in a magnesium melt, and thus avoids the damage to the chemical stability of the ceramic foam due to addition of adhesives such as silica sol, ethyl silicate, among others, to the prior art products.

TABLE 1

The calculated results of the Gibbs free energy changes ΔG for the reactions in the reaction system of magnesium melt with Mg—Al spinel.

| T | Gibbs Free Energy of Substance G (kJ/mol) | | | | | Gibbs Free Energy ΔG of Reaction (kJ/mol) | | | |
|---|---|---|---|---|---|---|---|---|---|
| (K) | Mg | Al | MgO | γ-$Al_2O_3$ | $MgAl_2O_4$ | $\Delta G_1$ | $\Delta G_5$ | $\Delta G_6$ | $\Delta G_7$ |
| 900  | −39.937 | −35.835 | −642.540 | −1744.794 | −2428.590 | −134.685 | −258.453 | −41.256 | −93.429 |
| 1000 | −47.288 | −42.645 | −650.503 | −1762.887 | −2454.192 | −132.288 | −254.694 | −40.802 | −91.486 |
| 1100 | −55.019 | −50.158 | −658.978 | −1782.290 | −2481.564 | −129.903 | −250.791 | −40.296 | −89.607 |
| 1200 | −63.127 | −57.960 | −667.925 | −1802.900 | −2510.578 | −127.414 | −246.673 | −39.753 | −87.661 |

The Gibbs free energy $\Delta G_5$ for the reaction equation (5), i.e., magnesium melt reacts with aluminum oxide to form Mg—Al spinel, is always the smallest at different temperatures, indicating that this reaction will happen first at common smelting and refining temperatures of magnesium alloys. Although reaction equation (7), i.e., liquid magnesium reacts with Mg—Al spinel, may be possible thermodynamically, this reaction is substantially a reaction between liquid magnesium and the decomposed product of Mg—Al spinel, i.e., aluminum oxide. However, it can be known from Table 1 that the reaction of Mg—Al spinel being decomposed into aluminum oxide and magnesium oxide (the reverse reaction of reaction equation (6)) would be hard to happen, and the residual aluminum oxide in the sintered ceramic will also react with liquid magnesium first in accordance with reaction equation (5) to form Mg—Al spinel. On the other hand, in the MgO—$Al_2O_4$ phase diagram, the MgO side is an eutectic phase diagram of MgO solid solution and MA spinel solid solution, and in the process of forming MA through in-situ reaction, there is essentially no dispersion of $O^{2-}$, but only interdiffusion of $Mg^{2+}$ and $Al^{3+}$ via fixed oxygen lattices, and the speed of formation is determined by $Al^{3+}$ that is with a slower diffusion. The MA phase is formed primarily on the $Al_2O_3$ Furthermore, the ceramic components are free of sodium salts (for example, sodium carboxymethyl cellulose is not used in the rheological agent), which removes the obstacle for the ceramic sintering which is caused by residue $Na^+$ having a greater ion radius.

Since the reaction equations (1) and (5) can take place spontaneously at the commonly used smelting temperatures, and the smelting temperatures of aluminum and alloys thereof are the same as the smelting temperatures of magnesium and alloys thereof, adverse reactions of equations (1) and (5) will not take place between MgO, MA spinel phase and the melt of aluminum and alloys thereof. As with the melt of magnesium and alloys thereof, this avoids the damage to the chemical stability of ceramic foam in the melt of aluminum and alloys thereof due to addition of adhesives such as silica sol, ethyl silicate, among others. Even if the materials comprise 1% of $SiO_2$, the reaction of $Al+SiO_2 \rightarrow Al_2O_3+Si$ will take place at a high temperature between the melt of aluminum and alloys thereof and $SiO_2$ in the ceramic. Therefore, the spinel-reinforced magnesium oxide-based foam ceramic filter of the present invention can also be used in the smelting and purification of aluminum and alloys thereof.

2. The spinel-reinforced magnesium oxide-based foam ceramic filter of the present invention has good low temperature sintering performance. The light calcined magnesium oxide fine powder used in the present invention has a relatively big lattice constant, with more structural defects, and has an extremely high sintering activity. In the sintering process, the nanometer alumina sol and the nanometer lanthanum oxide can be solid-solubilized into the lattice of MgO and cause a lattice distortion to the MgO crystal, and thus result in lattice activation; and by the reaction with the MgO particles, spinel phases of new compounds $MgAl_2O_4$ and $MgLa_2O_4$ are formed, so as to facilitate the sintering and bonding between the particles. On the other hand, the nanometer powder has the feature of big specific surface area, high surface energy and high activity, and when the low temperature sintering aid is added in the nanometer alumina sol and nanometer lanthanum oxide form, the match and mixing uniformity of ceramic particles are optimized, and the adequate contact between the sintering aid and the MgO particles will increase the reaction speed of forming the spinel quickly, so as to further decrease the sintering temperature, which is helpful in decreasing power consumption and the cost of the ceramic foam filter. The experimental results show that, when the sintering temperature is below 1350° C., the bonding of the sintering structure between the MgO particles is not sufficient, resulting in a lower strength of the product, while the sintering temperature of the structurally well bonded spinel-reinforced magnesium oxide foam ceramic filter is 1350° C.-1550° C.

3. The spinel-reinforced magnesium oxide-based ceramic foam filter of the present invention has good thermal shock resistance. The solid component in the alumina sol is highly active porous $\gamma$-$Al_2O_3$, which has the same structure as the Mg—Al spinel ($MgAl_2O_4$) crystal. In the solution provided by the present invention, the light calcined magnesium oxide particles with high sintering activity are wrapped by alumina sol film, and in the sintering process, Mg—Al spinel ($MgAl_2O_4$) phase is formed by in-situ reaction, which directly welds the cristobalite MgO grains. On the other hand, the atomic ion of rare earth La is far greater than the ion radius of Al and Mg ($r_{La}^{3+}$ is 1.06 A, $r_{Al}^{3+}$ is 0.50 A, $r_{Mg}^{2+}$ is 0.65 A, wherein A is Ångstrom). In the structure, highly stable $MgLa_2O_4$ spinel phase itself is of high migration resistance, and will also hinder the ion migration of $Al^{3+}$ and $Mg^{2+}$, and accordingly, decreases the grain boundary migration speed and inhibit the grain growth of periclase. Therefore, Mg—Al spinel ($MgAl_2O_4$) phase wrapping the periclase MgO grains and the $MgLa_2O_4$ spinel phase at the grain boundaries will impart a tightly bonded structure between the sintered ceramic grains, and the pinning effect of the spinel phases will inhibit the growth of MgO particles, so as to refine the microstructure of the ceramic foam and increase the compactness between the ceramic grains. Accordingly, the spinel-reinforced magnesium oxide-based foam ceramic filter so prepared exhibits much higher mechanical properties, high temperature resistance and thermal shock resistance.

Furthermore, in the method of preparation of the present invention, the etching of the polyurethane foam plastic template by NaOH makes the surface thereof roughened, and together with the treatment by a water solution of wetting agent dodecyl benzene sulfonate, the ceramic slurry can be easily coated on the polyurethane foam template. Additionally, the rheological agent, i.e., cellulose ether and polyvinyl butyral, is not only a good dispersant for the nanometer lanthanum oxide powder which prevents the slurry from being agglomerated, but also serves as an adhesive in the preparation of the biscuit. Upon soaking, the slurry can be securely adhered to the polyurethane foam template, which imparts the biscuit a very big strength, and the rheological agent can escape very easily in the sintering process without contaminating the article. Therefore, the quality of the ceramic foam filter is guaranteed.

BRIEF DESCRIPTION OF THE DRAWINGS

FIG. 1 is the flow diagram of the process for preparing the spinel-reinforced magnesium oxide-based foam ceramic filter.

DETAILED DESCRIPTION OF THE EMBODIMENTS OF THE INVENTION

The present invention will be further described by referring to the accompany drawing and the embodiments.

The spinel-reinforced magnesium oxide-based foam ceramic filter is obtained by coating onto a polyurethane foam carrier a slurry of light calcined magnesium oxide-based ceramic comprising a nanometer lanthanum oxide sintering aid, and then drying and sintering. The detailed process of preparation is shown in FIG. 1.

Example 1

With the ratio that nanometer lanthanum oxide accounts for 1% by mass of ceramic powder, a nanometer lanthanum oxide having a particle size of 30 nm and a light calcined magnesium oxide powder having a particle size of the order of 250 meshes (mean size $d_{50}$ being 58 μm) were dosed to prepare a ceramic powder. With a weight ratio of 1:1, a rheological agent was prepared by polyvinyl butyral and hydroxypropyl methyl cellulose.

With the following weight percentages, 15% nanometer alumina sol having a solid content of 20% (a commercial nanometer alumina sol having a pH value of about neutral was selected, the same for the following Examples), 0.8% rheological agent and the balance ceramic powder were dosed. In accordance with the ratio, the light calcined magnesium oxide powder was first added into a ball milling tank; the nanometer alumina sol, the nanometer lanthanum oxide, the rheological agent and a suitable amount of absolute ethanol (the amount to be determined by the solid content of the ceramic slurry, the same for the following Examples) were mixed and subjected to ultrasonic treatment for 30 minutes to have the nanometer lanthanum oxide powder fully dispensed prior to being added to the ball milling tank; with a ratio of 2:1 of ball to material, corundum balls were added, and ball milling was performed for 4 hours with a rotation speed of 60 rpm to achieve a uniform mixture to obtain a ceramic slurry having a solid content of 60%.

A 10 PPI polyurethane foam plastic template was subjected to a surface etching for 60 minutes in a 40° C. water solution of 15% NaOH, and then washed by clean water and dried naturally. Next, the template was soaked in a water solution of 2% dodecylbenzene sulfonic acid wetting agent, and then taken out and dried. The polyurethane foam plastic template was then soaked in the ceramic slurry, and a roller was used to squeeze the polyurethane foam plastic template to remove the redundant slurry to form a biscuit. The biscuit was then dried at 40° C. in a ventilation chamber by removing the ethanol solvent, and the ethanol solvent could be recovered by a recovery device.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1550° C. at a temperature rising rate of 50° C./h and the temperature was maintained for 2.5 hours. The biscuit was then cooled to the room temperature with the furnace to obtain a magnesium oxide-based ceramic foam filter.

Example 2

With the ratio that nanometer lanthanum oxide accounts for 3% by mass of ceramic powder, a nanometer lanthanum oxide having a particle size of 60 nm and a light calcined magnesium oxide powder having a particle size of the order of 500 meshes (mean size $d_{50}$ being 25 μm) were dosed to prepare a ceramic powder. With a weight ratio of 1:1, a rheological agent was prepared by polyvinyl butyral and hydroxypropyl methyl cellulose.

With the following weight percentages, 20% nanometer alumina sol having a solid content of 25%, 1.5% rheological agent and the balance ceramic powder were dosed. In accordance with the ratio, the light calcined magnesium oxide powder was first added into a ball milling tank; the nanometer alumina sol, the nanometer lanthanum oxide, the rheological agent and a suitable amount of absolute ethanol were mixed and subjected to ultrasonic treatment for 60 minutes to have the nanometer lanthanum oxide powder fully dispersed prior to being added to the ball milling tank; with a ratio of 2:1 of ball to material, corundum balls were added, and ball milling was performed for 2 hours with a rotation speed of 120 rpm to achieve a uniform mixture to obtain a ceramic slurry having a solid content of 65%.

A 20 PPI polyurethane foam plastic template was subjected to a surface etching for 40 minutes in a 50° C. water solution of 20% NaOH, and then washed by clean water and dried naturally. Next, the template was soaked in a 4% water solution of dodecylbenzene sulfonic acid wetting agent, and then taken out and dried. The polyurethane foam plastic template was then soaked in the ceramic slurry, and a roller was used to squeeze the polyurethane foam plastic template to remove the redundant slurry to form a biscuit. The biscuit was then dried at 50° C. in a ventilation chamber by removing the ethanol solvent.

The dried biscuit was put in a sintering furnace, and the temperature was elevated to 55° C.° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1350° C. at a temperature rising rate of 50° C./h and the temperature was maintained for 3 hours. The biscuit was then cooled to the room temperature with the furnace to obtain a magnesium oxide-based ceramic foam filter.

Example 3

With the ratio that nanometer lanthanum oxide accounts for 2% by mass of ceramic powder, a nanometer lanthanum oxide having a particle size of 50 nm and a light calcined magnesium oxide powder having a particle size of the order of 325 meshes (mean size $d_{50}$ being 45 μm) were dosed to prepare a ceramic powder. With a weight ratio of 1:1, a rheological agent was prepared by polyvinyl butyral and hydroxyethyl cellulose.

With the following weight percentages, 25% nanometer alumina sol having a solid content of 22%, 1.0% rheological agent and the balance ceramic powder were dosed. In accordance with the ratio, the light calcined magnesium oxide powder was first added into a ball milling tank; the nanometer alumina sol, the nanometer lanthanum oxide, the rheological agent and a suitable amount of absolute ethanol were mixed and subjected to ultrasonic treatment for 45 minutes to have the nanometer lanthanum oxide powder fully dispersed prior to being added to the ball milling tank; with a ratio of 2:1 of ball to material, corundum balls were added, and ball milling was performed for 3 hours with a rotation speed of 90 rpm to achieve a uniform mixture to obtain a ceramic slurry having a solid content of 70%.

A 15 PPI polyurethane foam plastic template was subjected to a surface etching for 50 minutes in a 45° C. water solution of 18% NaOH, and then washed by clean water and dried naturally. Next, the template was soaked in a 3% water solution of dodecylbenzene sulfonic acid wetting agent, and then taken out and dried. The polyurethane foam plastic template was then soaked in the ceramic slurry, and a roller was used to squeeze the polyurethane foam plastic template to remove the redundant slurry to form a biscuit. The biscuit was then dried at 45° C. in a ventilation chamber by removing the ethanol solvent.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1450° C. at a temperature rising rate of 50° C./h and the temperature was maintained for 2 hours. The biscuit was then cooled to the room temperature with the furnace to obtain a magnesium oxide-based ceramic foam filter.

Example 4

With the ratio that nanometer lanthanum oxide accounts for 2% by mass of ceramic powder, a nanometer lanthanum oxide having a particle size of 60 nm and a light calcined magnesium oxide powder having a particle size of the order of 300 meshes (mean size $d_{50}$ being 48 μm) were dosed to prepare a ceramic powder. With a weight ratio of 5:2:3 (polyvinyl butyral:hydroxypropyl methyl cellulose:hydroxyethyl cellulose), a rheological agent was prepared by polyvinyl butyral, hydroxypropyl methyl cellulose and hydroxyethyl cellulose.

With the following weight percentages, 20% nanometer alumina sol having a solid content of 20%, 1.0% rheological agent and the balance ceramic powder were dosed. In accordance with the ratio, the light calcined magnesium oxide powder was first added into a ball milling tank; the nanometer alumina sol, the nanometer lanthanum oxide, the rheological agent and a suitable amount of absolute ethanol were mixed and subjected to ultrasonic treatment for 45 minutes to have the nanometer lanthanum oxide powder fully dispersed prior to being added to the ball milling tank; with a ratio of 2:1 of ball to material, corundum balls were added, and ball milling was performed for 3 hours with a rotation speed of 100 rpm to achieve a uniform mixture to obtain a ceramic slurry having a solid content of 65%.

A 15 PPI polyurethane foam plastic template was subjected to a surface etching for 50 minutes in a 45° C. water solution of 15% NaOH, and then washed by clean water and dried naturally. Next, the template was soaked in a water solution of 4% dodecylbenzene sulfonic acid wetting agent, and then taken out and dried. The polyurethane foam plastic template was then soaked in the ceramic slurry, and a roller was used to squeeze the polyurethane foam plastic template to remove the redundant slurry to form a biscuit. The biscuit was then dried at 45° C. in a ventilation chamber by removing the ethanol solvent.

The dried biscuit was put in a sintering furnace, and the temperature was elevated to 550° C. at a temperature rising rate of 30° C./h to have organic substances such as the polyurethane foam and rheological agent, among others, in the ceramic foam filter biscuit decomposed, gasified and discharged, then the temperature was elevated to 1100° C. at a temperature rising rate of 200° C./h. Finally, the temperature was elevated to 1400° C. at a temperature rising rate of 50° C./h and the temperature was maintained for 2 hours. The biscuit was then cooled to the room temperature with the furnace to obtain a magnesium oxide-based ceramic foam filter.

In the above Examples, the experiments show that the ceramic foams prepared exhibited excellent thermal shock resistance and strength. The ceramic foams did not exhibit cracking after 50 times cooling in 900° C. air, and the natural temperature strength of the 10 PPI ceramic foam filters with a size of 75 mm×75 mm×25 mm was not less than 2 MPa.

The Examples described above would not limit the present invention in any way. All technical solutions obtained by equivalent substitutions or transformations are within the scope of present invention.

What is claimed is:

1. A method for preparing a spinel-reinforced magnesium oxide-based ceramic foam filter wherein the method comprises the steps of:

1) preparing a ceramic slurry having a solid content of 60%-70% by dosing 15%-25% by mass of a nanometer alumina sol, 0.8%-1.5% by mass of a rheological agent, and the balance magnesium oxide ceramic powder comprising a nanometer lanthanum oxide sintering aid, and then adding absolute ethanol and ball milling to mix until uniform; the rheological agent is a mixture of polyvinyl butyral and a cellulose ether, wherein polyvinyl butyral accounts for 50% of the weight of the rheological agent, the cellulose ether is one of industrial-use hydroxy propyl methyl cellulose and hydroxyethyl cellulose, or a mixture thereof; the magnesium oxide ceramic powder comprising a nanometer lanthanum oxide sintering aid is a mixture of a light calcined magnesium oxide and a nanometer lanthanum oxide;

2) soaking a polyurethane foam template into the ceramic slurry, squeezing by a roller press the polyurethane foam template to remove redundant slurry therein to make a biscuit, and then removing the ethanol solvent in a ventilation chamber at a temperature of 40° C.-50° C. to dry the biscuit;

3) putting the dried biscuit into a sintering furnace, elevating the temperature to 1350° C. 1550° C. and performing a high temperature sintering, cooling to the room temperature with the furnace to obtain the magnesium oxide-based ceramic foam filter.

2. The method for preparing a spinel-reinforced magnesium oxide-based ceramic foam filter according to claim 1, wherein the nanometer alumina sol has a solid content of 20%-25%, and a pH value of greater than, or equal to 4.

3. The method for preparing a spinel-reinforced magnesium oxide-based ceramic foam filter according to claim 1, wherein the nanometer lanthanum oxide accounts for 1%-3% by mass of the ceramic powder.

4. The method for preparing a spinel-reinforced magnesium oxide-based ceramic foam filter according to claim 1, wherein the light calcined magnesium oxide powder has a particle size in the order of 250-500 meshes.

5. The method for preparing a spinel-reinforced magnesium oxide-based ceramic foam filter according to claim 1, wherein the nanometer lanthanum oxide has a particle size of 30-60 nm.

6. The method for preparing a spinel-reinforced magnesium oxide-based ceramic foam filter according to claim 1, wherein a method of preparing the ceramic slurry is: with a ratio, adding the light calcined magnesium oxide powder into a ball milling tank; mixing the nanometer alumina sol, the nanometer lanthanum oxide, the rheological agent and the absolute ethanol and ultrasonic treating the mixture for 30-60 minutes to have the nanometer lanthanum oxide powder fully dispersed; adding the mixture into the ball milling tank; with a ball to material ratio of 2:1, adding corundum balls and ball milling for 2-4 hours with a rotation speed of 60-120 rpm until a uniform mixture is achieved.

7. The method for preparing a spinel-reinforced magnesium oxide-based ceramic foam filter according to claim 1, wherein the specification of the polyurethane foam template is 10 PPI-20 PPI; the polyurethane foam template is first soaked in a water solution of 15%-20% NaOH at 40° C.-50° C. for surface etching for 40-60 minutes, washed by clean water and naturally dried, and then soaked into a water solution of 2%-4% wetting agent dodecylbenzene sulfonic acid and taken out and dried before use.

8. The method for preparing a spinel-reinforced magnesium oxide-based ceramic foam filter according to claim 1, wherein in step 3), the sintering process is: the temperature is first elevated to 550° C. at a temperature rising rate of 30° C./h to have organic substances in the ceramic foam filter biscuit decomposed, gasified and discharged, then the temperature is elevated to 1100° C. at a temperature rising rate of 200° C./h, and finally, the temperature is elevated to 1350° C.-1550° C. at a temperature rising rate of 50° C./h and the temperature is maintained for 2-3 hours.

* * * * *